United States Patent [19]
Kataoka et al.

[11] Patent Number: 5,971,853
[45] Date of Patent: *Oct. 26, 1999

[54] OBJECT DIRECTION CONTROL METHOD AND APPARATUS

[75] Inventors: Hiroshi Kataoka; Koki Koiwa, both of Tokyo, Japan

[73] Assignee: Kabushiki Kaisha Sega Enterprises, Tokyo, Japan

[ * ] Notice: This patent is subject to a terminal disclaimer.

[21] Appl. No.: 09/097,054

[22] Filed: Jun. 15, 1998

Related U.S. Application Data

[63] Continuation of application No. 08/591,684, Jun. 25, 1996, Pat. No. 5,766,079.

[30] Foreign Application Priority Data

Jun. 20, 1994 [JP] Japan .................................. 6-137663

[51] Int. Cl.⁶ .......................................................... A63F 9/22
[52] U.S. Cl. .............................................................. 463/36
[58] Field of Search .................................. 463/36, 37, 38, 463/39

[56] References Cited

U.S. PATENT DOCUMENTS

| | | | |
|---|---|---|---|
| 4,486,629 | 12/1984 | Sledesky | 463/38 |
| 4,552,360 | 11/1985 | Bromley et al. | 463/38 |
| 5,346,398 | 9/1994 | Nakahata et al. | 434/70 |
| 5,704,837 | 1/1998 | Iwasaki et al. | 463/38 |

FOREIGN PATENT DOCUMENTS

| | | |
|---|---|---|
| 28 26 731 A1 | 12/1978 | Germany . |
| 4-51986 | 2/1992 | Japan . |
| 05031252 | 2/1993 | Japan . |
| 6-277362 | 10/1994 | Japan . |
| 7-75689 | 3/1995 | Japan . |
| 1 589 647 | 5/1981 | United Kingdom . |
| 2 283 302 | 5/1995 | United Kingdom . |
| WO 93/16776 | 9/1993 | WIPO . |

*Primary Examiner*—George Manuel
*Attorney, Agent, or Firm*—Finnegan, Henderson, Farabow, Garrett & Dunner, L.L.P.

[57] ABSTRACT

A direction control method and apparatus control the direction of a traveling object on a monitor, for example, in a video game device. An object having, for example, two elements to be directionally controlled with each of the elements being controllable in a rotational direction is displayed along with its background in a traveling state on a monitor. The object includes, for example, a war tank (31) used in a war game of a game device. The two elements to be directionally controlled includes a body (32) and a sight (33) of the tank (31). A target angle θ is designated by a single direction input unit 20(A) for the vehicle body (32) and the sight (33). The rotational direction of the sight (33) is controlled on the basis of the target angle θ. The rotational angle of the vehicle body (32) is controlled following the sight (33) on the basis of the traveling velocity of the tank (31) and the rotational angle Ya of the sight (33).

17 Claims, 8 Drawing Sheets

OBJECT DIRECTION CONTROL METHOD AND APPARATUS

This is a continuation of application Ser. No. 08/591,684, filed Jun. 25, 1996, now U.S. Pat. No. 5,766,099 which is hereby incorporated by reference.

TECHNICAL FIELD

The present invention relates to a direction control method and apparatus for controlling the direction of an object on a monitor of each of a home and an arcade video game device, and more particularly to a direction control method and apparatus which is applied to a game device which has an input unit by which the player designates the direction of an object.

BACKGROUND ART

Video game devices are classified roughly into home and arcade ones in accordance with use. The home video game devices generally have a game device body and a controller such as a joy pad each with the game device body being connected, for example, to a home video monitor. When a cassette ROM is inserted into the game device body and a start button is depressed, a game program stored in the cassette ROM is read by the game device body. When the player manipulates the controller to give an operational signal to the game device body, the game program starts up in the game device body to produce a video signal and an audio signal, which are delivered to the video monitor and displayed as an image and outputted as a sound, respectively.

Many arcade video game devices have a cockpit-like housing in which the game device body containing game programs and a large display screen are provided. A manipulation seat on which the player sits is provided facing the display. The player views a game screen while playing the game by operating the control unit such as a steering-type input unit provided at the player's seat.

The direction of a traveler or vehicle (a travelable character) displayed on the video monitor or display is controlled by the player's operation of the joy pad and/or steering-type input unit in the video game device. There are various travelers. Some travelers are required to be controlled in two directions as the case may be. For example, some games have a war tank as a traveler. In this case, the two directions are the traveling direction of the tank itself and the direction of sight of a canon mounted on the tank. When the directions of the tank, as well as the sight of the canon, are controlled, two steering elements are required; a regular steering element and a second steering element for sight control. Alternatively, both a direction key and a steering element are provided and operated.

In many cases, the home video game devices have only a joy pad as a control unit. Thus, in many cases, the joy pad and a steering element are used in combination. When the steering element is manipulated while depressing a button switch on the joy pad, the direction of canon sight is controlled, while when only the steering element is manipulated, the direction of the tank itself is controlled.

However, when the two devices are provided separately to control the two directions of the same traveler, the whole control unit of the game device becomes large-scale and complicated. Since the player is required to operate the two devices simultaneously or in parallel, the manipulation itself becomes complicated and the direction control which the player is intended to provide cannot be provided timely as the case may be, so much so that the complicated direction control can reduce the player's interest in the game itself.

DISCLOSURE OF THE INVENTION

It is a main object of the present invention to provide a direction control method and apparatus which simplifies the player's operation for direction control in a game which requires control of a plurality of directions in the same traveler.

Another main object of the present invention is to provide a direction control method and apparatus which simplifies the player's operation for direction control in a game which requires control of a plurality of directions in the same traveler, and avoiding the control unit of the game device being large-scale and complicated.

One of specified objects of the present invention is to provide a direction control method and apparatus which when traveling or moving, the direction of a traveler or vehicle in a game such as a war tank and the sight direction of a canon mounted on the tank is controlled in parallel, the invention simplifies the player's operation for direction control.

In order to achieve the above objects, the present invention provides an object direction control method of displaying on a monitor an object having a plurality of direction control elements each of which is controllable in a rotational direction, along with a background in a moving state, comprising the steps of designating a target angle for the plurality of direction control elements, controlling the rotational angle of any particular one of the plurality of direction control elements on the basis of the target angle, and controlling the rotational angle(s) of the remaining direction control element(s) so as to follow up the particular direction control element.

The number of direction control elements is two. The object comprises, for example, a war tank used in a tank game of a game device, and the two direction elements to be controlled comprise the body and sight of the tank. Preferably, the particular element to be directionally controlled comprises the sight, and the remaining element to be directionally controlled comprises the body of the tank.

For example, the particular element to be directionally controlled is rotated at a given velocity in accordance with the target angle. Preferably, a new rotational angle Ya of the particular element to be directionally controlled is given by $$Ya = Yb + Ka \cdot \theta$$

where $\theta$ is the target angle, Yb is the current rotational angle of the particular element to be directionally controlled, and Ka is a constant.

For example, the remaining element(s) to be directionally controlled are rotated depending on the moving velocity of the object and the rotational angle of the particular element to be directionally controlled. Preferably, a new rotational angle Za of the remaining element(s) to be directionally controlled is given by $$Zo = Ya$$

$$Za = Zb + Kb \cdot V \cdot (Zo - Zb)$$

where Zo is the target rotational angle of the remaining element(s) to be directionally controlled, Ya is the rotational angle of the particular element to be directionally controlled, Zb is the current rotational angle of the remaining element(s) to be directionally controlled, Kb is a constant, and V is the moving velocity of the object.

Further, preferably, the given velocity of rotation of the particular element to be directionally controlled is slightly higher than the maximum rotational follow-up velocity of the remaining element(s) directionally controlled.

The present invention provides an object direction control apparatus for displaying on a monitor an object having a plurality of direction control elements each of which is controllable in a rotational direction, along with a background in a moving state, comprising target angle designating means for designating a target angle for the plurality of direction control elements, first direction control means for controlling the rotational direction of any particular one of the plurality of direction control elements on the basis of the target angle, and second direction control means for controlling the rotational directions of the remaining direction control element(s) by following up the particular direction control element.

For example, the number of direction control elements is two. The object is a war tank used in a tank game in a game device. The two elements to be directionally controlled comprise the body and sight of the tank. The target angle designating means comprises a single direction input unit for manually inputting direction data on a target angle.

Thus, for example, the rotational direction of the sight in the tank game is controlled by input information from a single direction input unit and the rotational direction of the vehicle is controlled following up the canon sight. Thus, the control unit is required only to have, for example, a sight steering element (direction input unit). Thus, the operation is simplified and the player has an increased margin for sufficiently enjoying a game played using the present invention. With the present invention, the structure of the control unit is simplified, and the whole device is reduced in size and simplified.

PREFERRED EMBODIMENTS OF THE INVENTION

One embodiment of the present invention will be described next with reference to the drawings.

Figure 1:
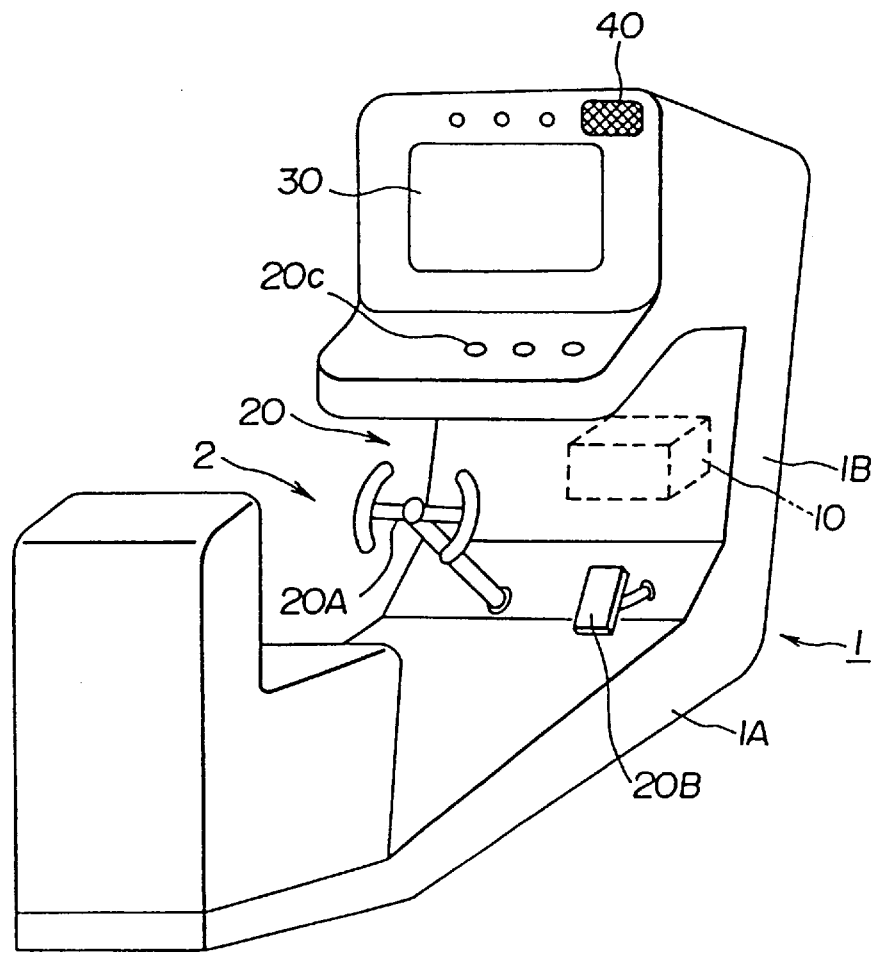
FIG. 1 is a perspective view of one embodiment of a game device to which an object direction control method and apparatus according to the present invention is applied.

FIG. 1 shows the appearance of an arcade video game device of this embodiment. The game device includes a functionally mounted object direction control method and apparatus according to the present invention.

The game device of FIG. 1 has a housing 1 which forms a cockpit. The housing 1 has a bottom 1A and a front 1B which continues to one end of the base 1A so as to be perpendicular to the base. The bottom 1A has a player's manipulation seat 2 on which the player sits to manipulate the game device. The front 1B has a game device body 10 therein. Provided at the player's seat 2 are a control unit 20 which includes a steering element 20A, an accelerator 20B, and a view change switch 20C; a video monitor 30 and a speaker 40 on the upper front.

Figure 2:
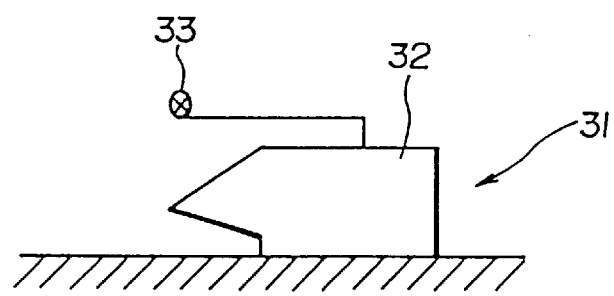
FIG. 2 schematically shows a war tank as an object.

The game device handles a tank game. The steering element 20A is the only control unit which gives direction data to the game device. The tank game handles the tank as a traveling or moving display object (vehicle). The tank 31 can be expressed schematically, as shown in FIG. 2, and has a body 32 and a canon sight 33.

Figure 3:
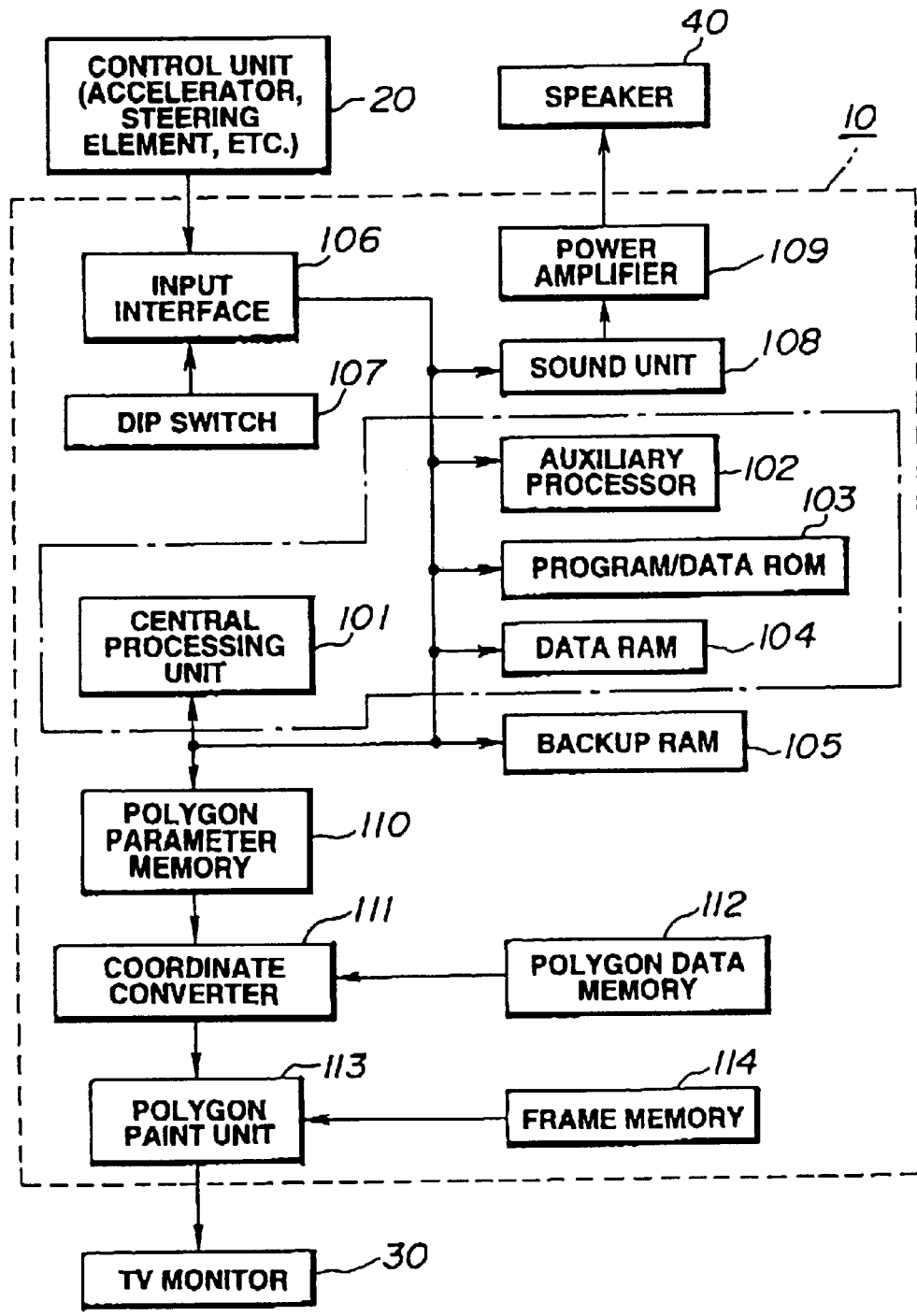
FIG. 3 is a block diagram of an electric system of the embodiment.

The electric block diagram of the game device is shown in FIG. 3. The game device body 10 includes a central processing unit (CPU) 101, an auxiliary processor 102, a program/data ROM 103, a data RAM 104, a backup RAM 105, an input interface 106, a dip switch 107, a sound device 108, a power amplifier 109, a polygon parameter memory 110, a coordinate converter 111 called a geometrizer, a polygon data memory 112, a polygon paint unit 113 called a rendering unit, and a frame memory 114.

Figure 5:
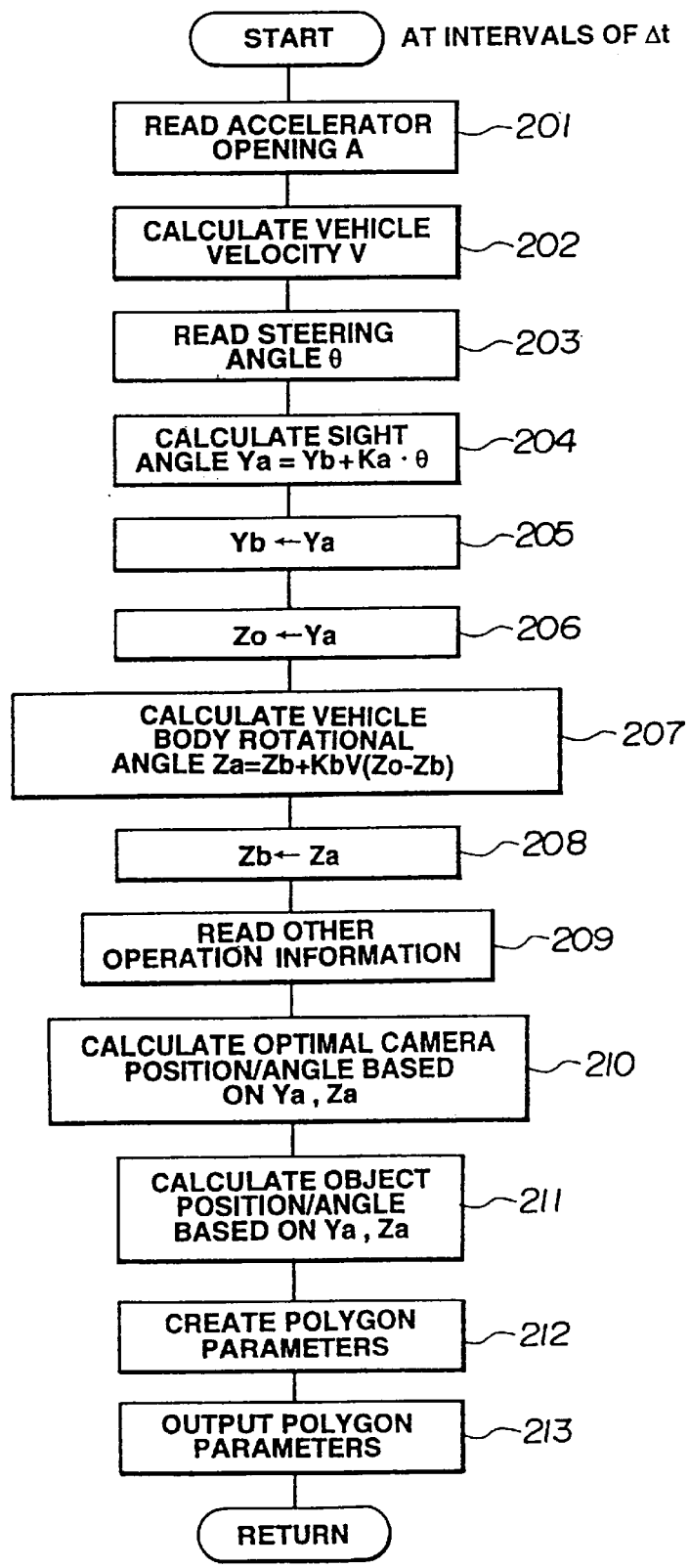
FIG. 5 is a flow chart which indicates the outline of a process which mainly provides the direction control of the central processing unit.

The central processing unit (CPU) 101 is connected through a bus line to the auxiliary processor 102, program/data ROM 103, data RAM 104, backup RAM 105, input interface 106, sound unit 108, and polygon parameter memory 110. The input interface 106 is connected to the control unit 20 and the dip switch 107. The CPU 101 reads data on a game program contained beforehand in the program/data ROM 103 in cooperation with the auxiliary processor 102 to execute the program. The game program contains the control of the position, direction and angle of a tank as an object displayed on the video monitor 30 and control of the position and angle of a virtual camera which determines the visual field of the display screen. The outline of the control is shown in FIG. 5.

The virtual camera can be compared to a regular camera in terms of a viewpoint and an image angle used when computer graphics are delineated. The setting of the virtual camera is performed by designating the position, optical axis direction (the direction of the lens), an image angle (zoom-wide), and a twist (a rotational angle around the optical axis). In other words, the virtual camera is a virtually set viewpoint. The virtual camera is understood as a virtual visual field direction determining means for determining the visual field direction of an image displayed on the video monitor. An object (figure) which has been modeling-converted from a body coordinate system inherent in the figure to a world coordinate system which defines the disposition of the figure (object) in a three-dimensional space is converted in visual field to a visual field coordinate system defined by (the position and angle of) the virtual camera and the resulting object figure is then displayed on the monitor 30.

The sound device 108 is connected through the power amplifier 109 to the speaker 40. An acoustic signal produced by the sound device 108 is amplified by the amplifier 109 and delivered to the speaker 40.

A read terminal of the polygon parameter memory 110 is connected to a coordinate conversion unit 111 to which polygon parameters in the memory 110 are delivered. The coordinate conversion unit 111 is connected to a polygon data memory 112 so as to receive polygon data from the memory 112. The coordinate converter 111 converts three-dimensional polygon coordinate values to be displayed in two-dimensional perspective coordinate values on the basis of given polygon parameters and polygon data. The output of the coordinate converter 111 is connected to the polygon paint unit 113 such that the polygon data which has been converted so as to have the perspective coordinates is delivered to the polygon paint unit 113, which paints received polygons with texture data stored in the frame memory 114 to form image data. The output of the polygon paint unit 113 is connected to the video monitor 30 on which the image data formed by the paint unit 113 is displayed.

An accelerator 20B of the control unit 20 outputs an electric signal indicative of an accelerator opening A which is reflected by a traveling velocity V of the object on the video monitor 30 in response to the player's operation. Similarly, the steering element 20A outputs an electric signal indicative of a direction $\theta$ in which the actions of the object are reflected. The steering element 20A composes object angle designating means in the present invention. The view change switch 20C is a switch with which the player designates the position of the virtual camera which determines the visual field of an image displayed on the video monitor 30.

Figure 4:
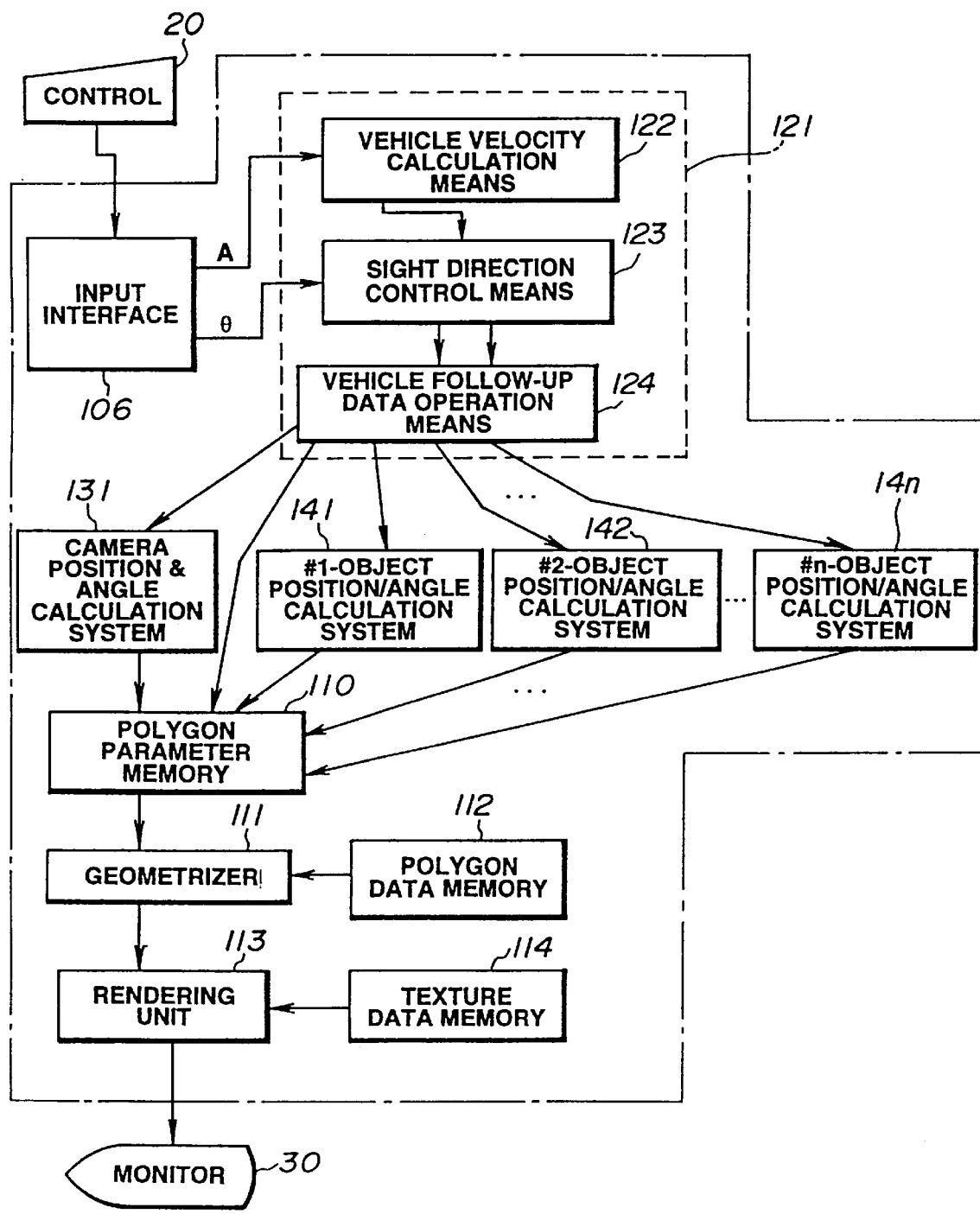
FIG. 4 is a block diagram of an electric system which includes a functional block structure of a central processing unit and its peripheral circuits.

FIG. 4 shows a block diagram of a part of the functions of the CPU 101 and its peripheral circuits (surrounded by a dot-dashed line) of FIG. 3. The CPU 101 and its peripheral circuit performs the processing of FIG. 5 to be described later to functionally realize a player position angle calculation system 121, a camera position angle calculation system 131, and an n-object position angle calculation system. The player position angle calculation system 121 functionally includes a traveler or vehicle velocity calculation means 122, sight direction control means 123, and a traveler or vehicle follow-up data creation means 124.

The processing of FIG. 5 which the CPU 101 performs in cooperation with the auxiliary processor 102 will be described next. This process is performed, for example, on a timer interrupt basis at predetermined intervals of $\Delta t$.

First, an accelerator opening A from the accelerator 20B is read (step 201). From an opening degree A of the accelerator, a traveling velocity V of the tank 31 as an object is calculated on the basis of, for example, table lookup (step 202).

Figure 6:
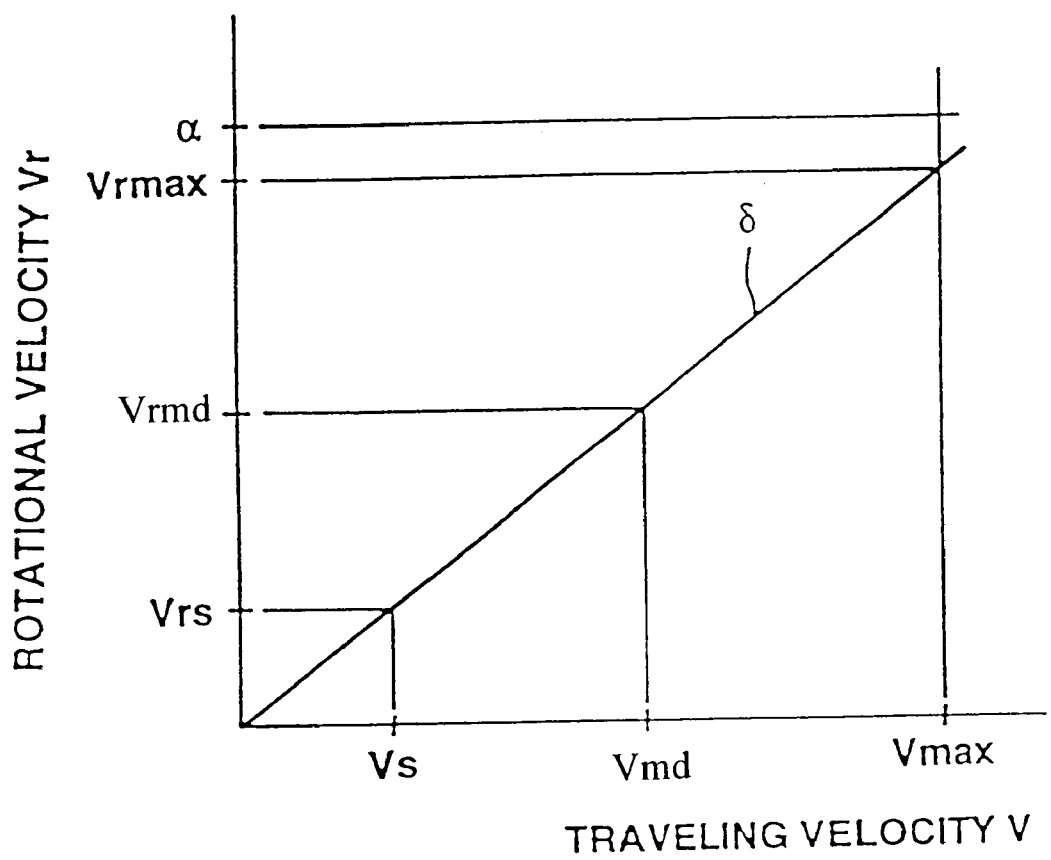
FIG. 6 illustrates the relationship between the traveling velocity of a tank, and the sight and the rotational velocity of the tank body.

A signal indicative of the steering angle $\theta$ of the steering element 20A is read (step 203), and a sight angle Ya used to control the sight direction is calculated on the basis of the steering angle $\theta$ as follows (step 204):

$$Ya = Yb + Ka \cdot \theta \qquad (1)$$

where Yb is the current sight angle 33, Ka is a constant to rotate the sight 33 at a given velocity $\alpha$, which will be described with reference to FIG. 5. As shown in FIG. 6, set beforehand in the program/data ROM 103 is a table which has beforehand stored data on the relationship expressed by a straight line $\delta$ between the traveling velocity V of the tank 31 (horizontal axis) and the rotational velocity Vr of the tank 31 or its body 32 (vertical axis). As will be described later, the linear line $\delta$ is used to determine a rotational velocity Vr from a traveling or moving velocity V and defines a proportional state from the traveling moving velocity V=0 (at this time, the rotational velocity Vr=0) to the highest traveling velocity V=Vmax (at this time, the highest rotational velocity Vr=Vrmax). In FIG. 6, the predetermined velocity $\alpha$ is always set at a predetermined velocity slightly higher than the highest rotational velocity Vrmax irrespective of the traveling velocity V.

As described above, when a sight angle Ya is calculated which rotates at the predetermined velocity by an angle depending on the steering angle $\theta$, the current value Yb is updated with the new calculated value Ya for the next time operation (step 205).

The CPU 101 then sets the calculated sight angle Ya as a target rotation direction Zo of the tank 31 to create object follow-up data (step 206) and calculates the rotational angle Za of the tank 31 (step 207) as follows:

$$Za = Zb + Kb \cdot V \cdot (Zo - Zb) \qquad (2)$$

where V is the traveling velocity of the tank 31, Zb is the current traveling direction of the tank, and Kb=$\gamma$/Vmax (constant) ($0 < \gamma \leq 1$) where Vmax is the highest traveling velocity of the tank 31.

The second term "Kb·V" of expression (2) is expressed by the straight line $\delta$ (=Kb·V) of FIG. 5. When the traveling velocity V of the tank 31 is low, for example, V=Vs, the rotational velocity Vr becomes a low velocity Vr=Vrs in accordance with the straight line $\delta$. When the traveling velocity V of the tank 31 is medium, for example, V=Vmd, the rotational velocity Vr also becomes a medium velocity Vr=Vrmd. When the traveling velocity V of the tank 31 is the highest one V=Vmax, the rotational velocity Vr becomes the highest velocity Vrmax, which is slightly lower than the rotational velocity $\alpha$ of the sight 32.

As described above, when a new rotational angle Za of the tank 31 is determined, this rotational angle Za is set in place of the current rotational angle Zb for creation of the next-time follow-up data (step 208).

The CPU 101 then reads information about the operation of the view change switch 20C designed by the player other than the accelerator opening A, and the steering angle $\theta$ (step 209).

Among the information about the operation, already processed switch information from the view change switch 20C and the steering angle $\theta$ of the steering element 20A, as described above, is used to calculate the position and angle of the virtual camera. More specifically, the camera position and angle (direction) optimal for display on the video monitor 30 are calculated on the basis of the calculated latest sight angle Ya, vehicle body rotational angle Za and the information about the operation (step 210). The position and direction of the camera are conditions which define an image displayed on the monitor in the world of a game constructed three-dimensionally. Switch information from the view change switch 20C changes the positional relationship between the tank 31 and the camera. More specifically, it changes the position (distance) and angle of elevation of the tank 31 relative to the camera.

Figure 7:
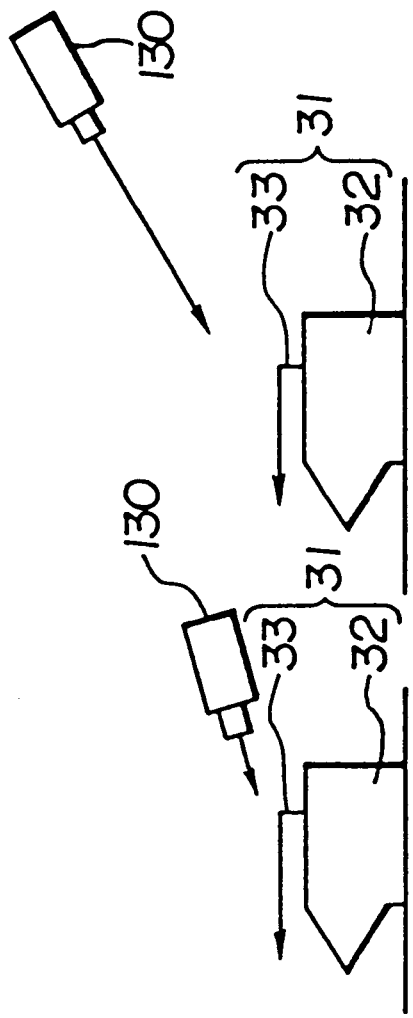
FIGS. 7A–7C illustrate the positional relationship between a virtual camera and a tank.
Figure 8:
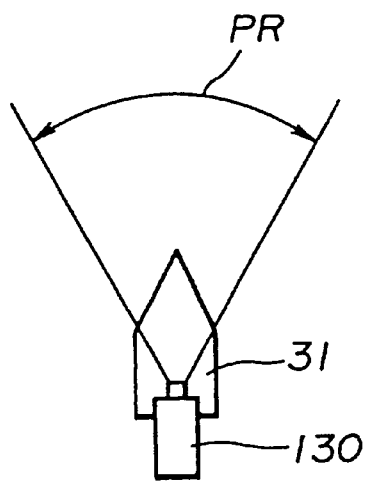
FIG. 8 illustrates the visual field of a virtual camera and the travelling direction of a tank.
Figure 9:
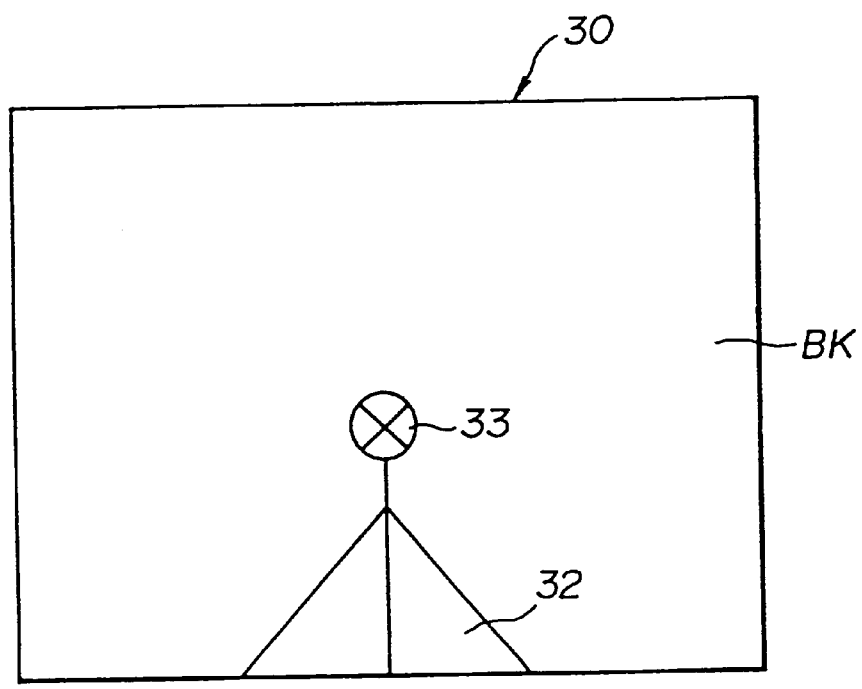
FIG. 9 illustrates a video monitor screen.

For example, it is determined whether a camera 130 is disposed directly above the tank 31, as shown in FIG. 7A, whether the camera 130 is disposed obliquely above and behind the tank 31, as shown in FIG. 7B, or whether the camera 130 is disposed high in the sky behind the tank 31, as shown in FIG. 7C. In the case of the positional relationship of FIG. 7A, the image pick up range PR of the camera 130 is present in the travel direction of the tank 31, which aligns with the center line of the image pick-up range PR of the camera 130, as shown in FIG. B. An eye (the left and right directions of the viewpoint) is determined, which rotates around an axis normal to the ground surface, in accordance with the angle Ya of the sight 33 determined on the basis of the steering angle. An image in front of the tank 31 in the eye direction defined by the position and angle of the camera, thus determined, is displayed on the video monitor 30 (FIG. 9).

The position and angle of an object optimal for display on the video monitor 30 are selected on the basis of the latest sight angle Ya, vehicle body rotational angle Za and other operation information (step 211). Since a plurality of (n) objects such as an enemy tank, a player's tank, a background and the sky is prepared beforehand, appropriate objects which fall in the visual field of the camera are selected from among the n objects.

Polygon parameters used for display on the basis of the various results of the calculations obtained as mentioned above, are calculated. The polygon parameters are delivered along with information about the designation of polygons used for display to the polygon parameter memory 110 (steps 212, 213). That is, information about coordinate conversion (movement, rotation, enlargement, reduction, etc.) and display/non-display of the respective objects is stored in the polygon parameter memory 110.

The processing of FIG. 5 composes first and second direction control means of the present invention. Steps 201–208 of the processing functionally compose the player position angle calculation system 121. The steps 201 and 202 correspond to the vehicle velocity calculation means 122. Steps 203–205 correspond to the sight direction control means 123. Steps 206–208 corresponds to the vehicle follow-up data creation means 124. Steps 210 and 211 functionally realize the essential portions of the camera position angle calculation system 131 and the essential portion of the n-object position angle calculation system, respectively.

The coordinate converter (geometrizer) 111 reads information stored in the polygon parameter memory 110 and performs coordinate conversion involving a matrix operation on objects stored in the polygon data memory 112 on the basis of the read information to thereby provide display data, which is then delivered to the polygon paint unit 113 where the display data is coated with texture data stored in the frame memory 114. The display data expressed very realistically by that texture mapping is then delivered to the video monitor 30 and various objects including the tank 31 are displayed in the background BK on a real-time basis, as shown in FIG. 9.

Subsequently, an illustrative specified operation of the device will be described next.

Assume now that the step-down quantity of the accelerator 20B by the player is small and the accelerator opening A is small. The accelerator opening A is delivered to the CPU 101 through the input interface 106. The CPU 101 calculates the traveling velocity V of the tank 31 on the basis of the accelerator opening A. If the steering element 20A has not been operated, a polygon parameter corresponding to the traveling velocity V is calculated. Thus, the tank 31 and its background BK appear to change at a slow velocity V relative to each other on the display screen of the monitor 30 and the tank 31 appears to travel at the relative velocity V.

Assume now that during the travel of the tank the player tries to turn the steering element 20A through a desired angle θ (in this example, 90 degrees). This steering angle θ is read through the input interface 106 by the CPU 101, which calculates a sight angle Ya through which the sight 33 is rotated in the steering direction of the steering element in units of a small increment of the changing steering angle of the moment at the given velocity α (FIG. 6), using the expression (1). The sight angle Ya is handled as a target rotational angle Zo and a rotational angle Za is calculated which rotates the tank body 32 while following the sight 33. In this calculation, the rotational angle Za is calculated as an angle smaller by a coefficient "Kb·V" of the expression (2) than the sight angle Ya. In this case, since the traveling velocity V is low, the value of the coefficient "Kb" is small, so that data on the rotational angle Za of the vehicle body 32 is delayed greatly compared to the sight angle Ya.

Figure 10:
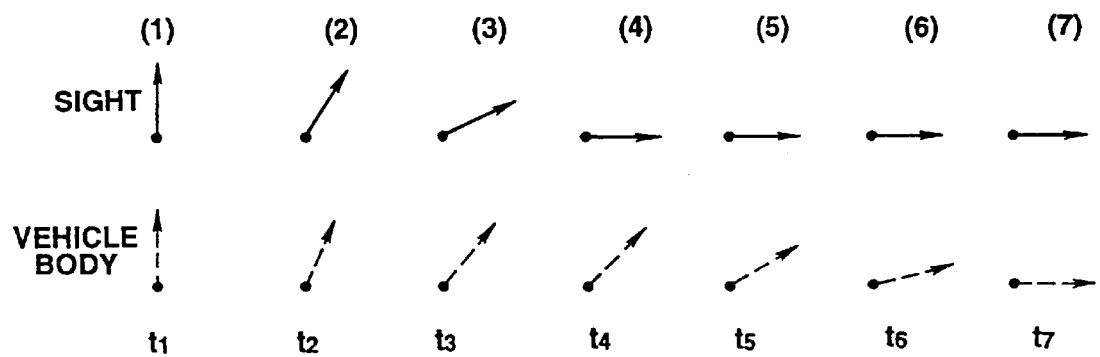
FIG. 10 illustrates vectors indicative of the rotational situation of the sight and tank body in time series when the tank travels at low velocity.

This situation is schematically shown in FIGS. 10 (1)–(7). More specifically, as the time elapses from t1 to t7, the sight 33 changes, for example, in order of 0 degrees (initially, time t1), 30 degrees (time t2), 60 degrees (time t3), and 90 degrees (after time t4) in correspondence to the respective time-dependent changes of the steering angle θ through 90 degrees. Parallel with this, the rotation (direction) of the vehicle body 32 changes or is gradually delayed relative to the sight angle, for example, in order of θ degrees (time t1) (in this case, the rotational angles of the vehicle body and sight angle are the same (0 degrees)), 15 degrees (time t2), 30 degrees (time t3), 45 degrees (time t4), 60 degrees (time t5), 75 degrees (time t6), and 90 degrees (time t7). That is, when the tank 31 travels at a low velocity, the quantity of delay is comparatively large.

In contrast, assume now that a step-down quantity of the accelerator 20B applied by the player is large, for example, the accelerator opening A is maximum The accelerator opening A is read by the CPU 101, as described above, and the traveling velocity V=Vmax of the tank 31 is calculated. Assume now that the steering element 20A has not been operated. In this case, polygon parameters corresponding to the traveling velocity Vmax is calculated, so that the tank 31 and the background BK appear to change at high velocity V=Vmax relative to each other on the display screen of the monitor 30, and the tank 31 appears to move at the highest velocity Vmax.

Assume now that during the travel of the tank the player tries to turn the steering element 20A through a desired angle θ (in this example, 90 degrees). This steering angle θ is read by the CPU 101, which calculates a sight angle Ya through which the sight 33 is rotated in the steering direction of the steering element in units of a small increment of the changing steering angle of the moment at the given velocity α (FIG. 6), using the expression (1). The sight angle Ya is handled as a target rotational angle Zo and a rotational angle Za is calculated through which the tank body 32 is rotated follows the sight 33. In addition, by handling the sight angle Ya as a target rotational angle Zo, a rotational angle Za is calculated through which the tank body 32 is rotated while following up the sight 33. In this calculation, the rotational angle Za is calculated as an angle smaller by a coefficient "Kb·V" of the expression (2) than the sight angle Ya. In this case, since the traveling velocity V is high, and the value of the coefficient "Kb·V" is also large, and the rotational velocity of the tank body 32 controlled so as to be substantially the same as the predetermined rotational velocity α of the sight 33, data on the rotational angle Za of the tank body 32 is delayed slightly compared to the sight angle Ya.

Figure 11:
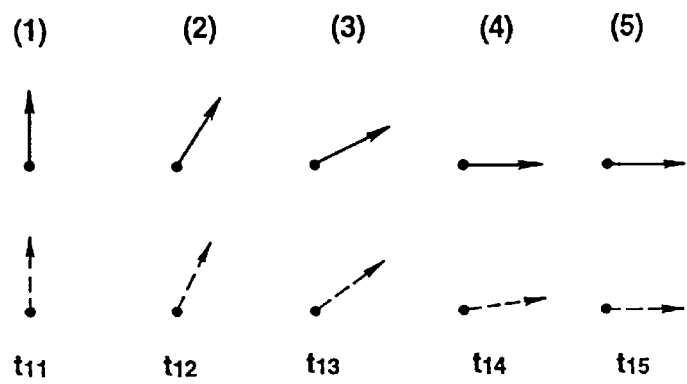
FIG. 11 illustrates vectors indicative of the rotational situation of the canon sight and tank body in time series when the tank travels at the highest velocity.

This situation is schematically shown as an example in FIGS. 11 (1)–(5). More specifically, as the time lapses from t11 to t15, the sight 33 changes, for example, in order of 0 degrees (initially, time t11), 30 degrees (time t12), 60 degrees (time t13), and 90 degrees (after time t14) in correspondence to the respective time-dependent phases of the steering angle θ increasing until 90 degrees. In parallel with this, the rotation (direction) of the vehicle body 32 also changes, for example, in order of 0 degrees (initially, time t11), 29 degrees (time t12), 58 degrees (time t13), 87 degrees (time t14), 90 degrees (time t15). That is, when the tank 31 travels at increasing velocity, the tank body 32 rotates while following up the sight angle substantially on a real time basis and hence the quantity of delay is reduced. Especially, when the tank is the highest velocity V=Vmax, the tank body 32 rotates at substantially the same velocity as the sight 33.

As will be seen from the illustration of FIGS. 10 and 11, when the steering element 20A of the control unit 20 is operated, and when the traveling velocity V of the tank 31 is relatively low (for example, V=Vs in FIG. 6), the rotational velocity Vr of the vehicle body 32 is low. Thus, the vehicle body 32 follows up the rotation of the sight 33 in a considerably delayed manner. When the traveling velocity V of the tank 31 is medium (for example, V=Vmd in FIG. 6), the rotational velocity Vr of the vehicle body 32 takes a medium value. Thus, the vehicle body 32 rotates following the sight 33 with a medium delay, which decreases as the tank 31 travels at increasing velocity. When V=Vmax, both rotates at substantially the same velocity, as shown in FIG. 11.

As described above, in response to the steering operation of the steering element, both the sight 33 and the vehicle body 32 rotate through an angle depending on the steering angle $\theta$. The vehicle body 32 follows the sight 33 with a quantity of delay depending on the traveling velocity V. The rotation of the sight 33 has priority, so that the player is only required to perform the steering operation by being conscious of the rotational direction of the sight 33. Thus, manipulation of the two steering elements, the operation of which was required conventionally, is not required now, so that control of the direction of the objects is greatly simplified and the player has an increased margin for enjoying the game. Since the number of steering elements is reduced compared to the conventional system, cost reduction is achieved by reducing the number of components and the control unit of the game device is prevented from being large-scale or complicated.

Since in the present embodiment the sight 33 is controlled preferentially in response to the steering operation, there is no hindrance to the game's operations on control of the sight 33 such as, for example, firing a bullet from a canon. Because of such preferential control, the steering angle, the position of the sight 33 and an image (that is, the visual field of a virtual camera) displayed on the monitor 30 are always in phase with each other, which is convenient for the tank game.

While the embodiment has been illustrated as the arcade video game device, the direction control method and apparatus according to the present invention is also applicable advantageously to the home video game devices. While in the conventional home game devices two direction control elements, that is, the joy pad and steering element, have been required to be provided and combined in manipulation, according to the present invention, only one direction control unit, for example, one kind of joy pad is required to be operated. Thus, operation is easy, and the game device is simplified and reduced in size.

While in the embodiment the tank has been illustrated as the object which requires control of a plurality of directions, the object need not necessarily be limited to a tank. Other movable objects such as, for example, battleships, fighters, etc., may be used, of course.

While in the embodiment the sight of the two direction control elements, that is, the vehicle body and sight, of the tank as the traveling object is preferentially controlled and the vehicle body is controlled so as to follow up the sight, the rotation of the vehicle body may be first controlled and the sight may follow up the movement of the vehicle body. If the content of the battle game of the tank lays emphasis on the travel of the vehicle body rather than the free use of the sight, control which realizes this concept can increase playability as the case may be.

We claim:

1. An object direction control method for displaying on a monitor an object having a plurality of direction control elements each of which is controllable in a rotational direction, along with a background in a moving state, comprising the steps of:

designating a target angle for the plurality of direction control elements based on input from a single operator using a single manipulation element:

controlling a rotational angle of one of the plurality of direction control elements on the basis of the target angle to turn the one direction control element in a rotational direction: and controlling a rotational angle of at least one other direction control element to follow up the one direction control element by automatically turning the at least one other direction control element in the rotational direction of the one direction control element.

2. An object direction control method according to claim 1, wherein the number of direction control elements is two.

3. An object direction control method according to claim 2, wherein the object comprises a war tank used in a tank game of a game device, and the two direction control elements comprise a body and a sight of the tank.

4. An object direction control method according to claim 3, wherein the one direction control element comprises the sight, and the at least one other direction control element comprises the body of the tank.

5. An object direction control method according to claim 1, wherein a velocity at which the one direction control element is turned depends upon a moving velocity of the object.

6. An object direction control method according to claim 5, wherein a new rotational angle Ya of the one direction control element is given by $$Ya = Yb + Ka \cdot \theta$$

where $\theta$ is the target angle, Yb is a current rotational angle of the one direction control element, and Ka is a constant.

7. An object direction control method according to claim 5, wherein the at least one other direction control element is turned depending on the moving velocity of the object and the rotational angle of the one direction control element.

8. An object direction control method according to claim 7, wherein a new rotational angle Za of the at least one other direction control element is given by $$Zo = Ya$$

$$Za = Zb + Kb \cdot V \cdot (Zo - Zb)$$

where Zo is a target rotational angle of the at least one other direction control element, Ya is the rotational angle of the one direction control element, Zb is a current rotational angle of the at least one other direction control element, Kb is a constant, and V is the moving velocity of the object.

9. An object direction control method according to claim 8, wherein the turning velocity of the one direction control element is slightly higher than a maximum turning velocity of the at least one other direction control element.

10. An object direction control method according to claim 1, wherein the step of controlling the rotational angle of the at least one other direction control element includes the substep of controlling the rotational angle of the at least one other direction control element to automatically turn the at least one other direction control element in the rotational direction of the one direction control element with delay.

11. An object direction control apparatus for displaying on a monitor an object having a plurality of direction control elements each of which is controllable in a rotational direction, along with a background in a moving state, comprising:

single target angle designating means for designating a target angle for the plurality of direction control elements in response to input from a single operator;

first direction control means for controlling a rotational direction of one of the plurality of direction control elements on the basis of the target angle to turn the one direction control element in the rotational direction; and second direction control means for controlling a rotational direction of at least one other direction control element to follow up the one direction control element by automatically turning the at least one other direction control element in the rotational direction of the one direction control element.

12. An object direction control apparatus according to claim 11, wherein the number of the plurality of direction control elements is 2, wherein the object is a war tank used in a tank game in a game device, and wherein the two direction control elements comprise a body and a sight of the tank.

13. An object direction control apparatus according to claim 12, wherein said target angle designating means comprises a single direction input unit for manually inputting direction data on the target angle.

14. An object direction control apparatus according to claim 13 wherein the first direction control means comprises means for rotating the one direction control element at a velocity in accordance with the target angle, and means for calculating a new rotational angle Ya of the one direction control element, given by $$Ya = Yb + Ka \cdot \theta$$

where $\theta$ is the target angle, Yb is a current rotational angle of the one direction control element, and Ka is a constant.

15. An object direction control apparatus according to claim 14, wherein the second direction control means comprises means for rotating the at least one other direction control element in accordance with a moving velocity of the object and the rotational angle of the one direction control element, and means for calculating a new rotational angle Za of the at least one other direction control element by $$Zo = Ya$$

$$Za = Zb + Kb \cdot V \cdot (Zo - Zb)$$

where Zo is a target rotational angle of the at least one other direction control element, Ya is the rotational angle of the one direction control element, Zb is a current rotational angle of the at least one other direction control element, Kb is a constant, and V is the moving velocity of the object.

16. An object direction control method for displaying on a monitor an object having a plurality of direction control elements each of which is controllable in a rotational direction, along with a background in a moving state, comprising the steps of:

designating a target angle for the plurality of direction control elements based on input from a single operator using a single manipulation element;

controlling a rotational angle of one of the plurality of direction control elements on the basis of the target angle to rotate the one direction control element by a degree equal to the rotational angle at a first velocity of rotation; and controlling a rotational angle of at least one other direction control element to rotate the at least one other direction control element by a degree corresponding to the rotational angle of the one direction control element at a second velocity of rotation different than the first velocity of rotation.

17. An object direction control apparatus for displaying on a monitor an object having a plurality of direction control elements each of which is controllable in a rotational direction, along with a background in a moving state, comprising:

a single manipulation means for receiving input from a single operator;

target angle designating means for designating a target angle for the plurality of direction control elements in response to the operator input;

first direction control means for controlling the rotational direction of one of the plurality of direction control elements on the basis of the target angle to rotate the one direction control element in the rotational direction at a first velocity of rotation; and second direction control means for controlling the rotational direction of at least one other direction control element to rotate the at least one other direction control element in the rotational direction corresponding to the rotational direction of the one direction control element at a second velocity of rotation different than the first velocity of rotation.

* * * * *